United States Patent [19]

Bradbury

[11] 4,372,435
[45] Feb. 8, 1983

[54] POSITIVELY DRIVEN STEERING MEMBER FOR CONVEYING APPARATUS

[75] Inventor: Bernard G. Bradbury, Chico, Calif.

[73] Assignee: Rexnord Inc., Milwaukee, Wis.

[21] Appl. No.: 201,666

[22] Filed: Oct. 27, 1980

[51] Int. Cl.³ .................... B65G 47/48; B65G 47/68
[52] U.S. Cl. .................................. 198/356; 193/36;
193/37; 198/369; 198/436; 198/782; 403/112;
474/199; 474/902; 464/122; 464/145
[58] Field of Search ............... 198/356, 365, 367, 369,
198/436, 782, 786; 193/36, 37; 403/112–117;
271/251; 226/21-23, 192, 194; 474/198, 199,
902; 64/7, 8, 17 R, 21

[56] References Cited

U.S. PATENT DOCUMENTS

| 1,625,410 | 4/1927 | De Ram | 64/17 R X |
| 2,510,362 | 6/1950 | Anderson | 64/8 X |
| 2,613,790 | 10/1952 | Schottelkotte |  |
| 3,254,752 | 6/1966 | Bauch et al. |  |
| 3,283,842 | 11/1966 | Watt | 64/8 X |
| 3,424,473 | 1/1969 | Morgan | 64/21 X |
| 3,910,402 | 10/1975 | Dean |  |
| 3,983,988 | 10/1976 | Maxted et al. |  |

FOREIGN PATENT DOCUMENTS

| 55-36682 | 3/1980 | Japan | 64/17 R |
| 416458 | 1/1967 | Switzerland | 193/36 |
| 766583 | 1/1957 | United Kingdom | 64/17 R |

OTHER PUBLICATIONS

IBM Technical Disclosure Bulletin; vol. 23, No. 5; pp. 1817–1819; "Skewed Drive" by Arsenault et al.; Oct. 1980.

Primary Examiner—Jeffrey V. Nase
Attorney, Agent, or Firm—Robert H. Kelly; Vance A. Smith; Theresa F. Camoriano

[57] ABSTRACT

A device adapted for use as a positively driven steering member in a conveying apparatus, having a wheel with a spherically curved inner surface, a hub with a spherically curved outer surface which fits inside of the wheel, and a coupling which secures the wheel to the hub, permitting the axis of the wheel to be rotated relative to the axis of the hub in any direction while restraining relative motion between the wheel and hub about the axis of the hub. This arrangement provides that, when the hub is driven by a shaft passing through its axis, it drives the wheel, regardless of the angle between the hub and wheel.

17 Claims, 11 Drawing Figures

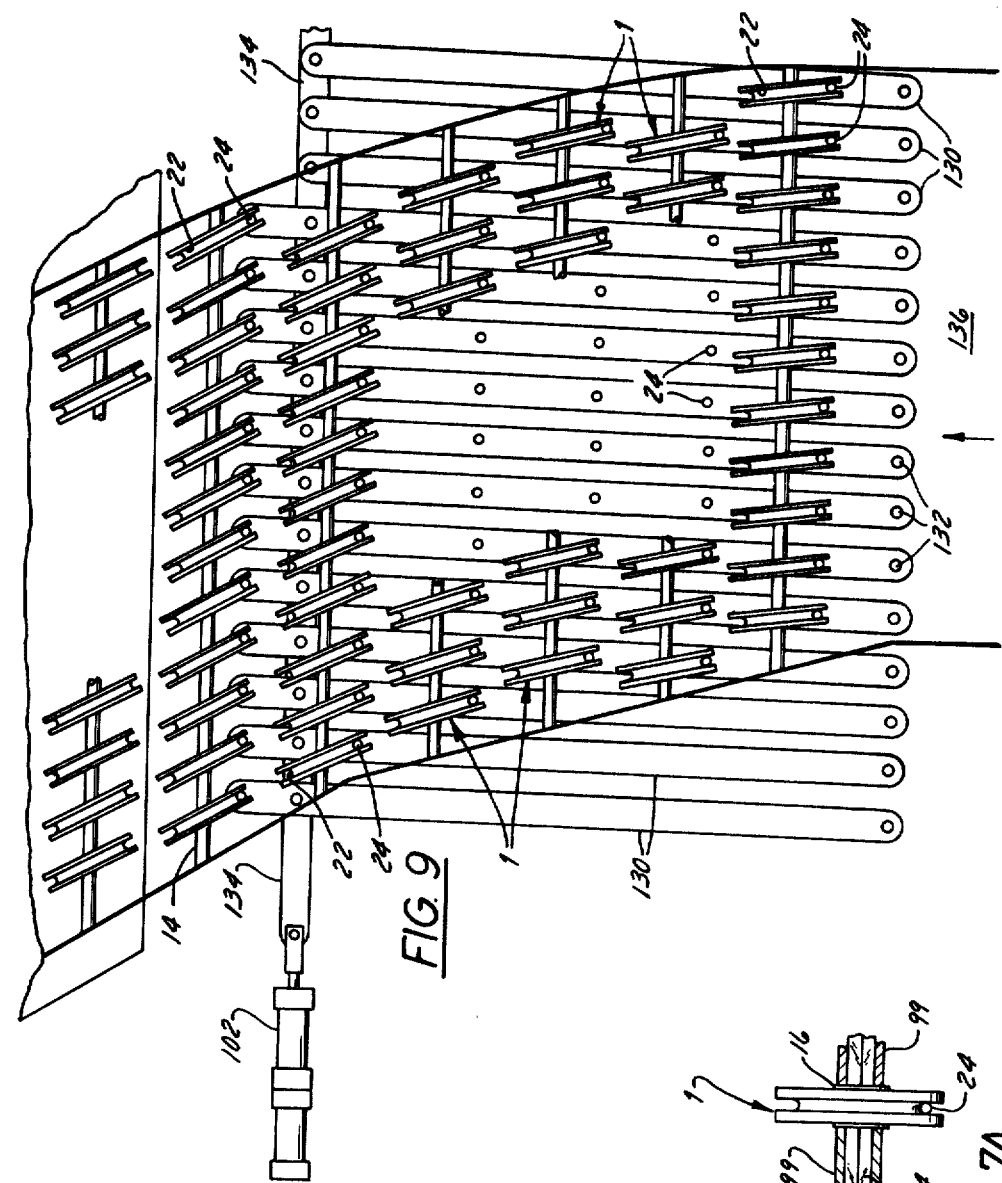
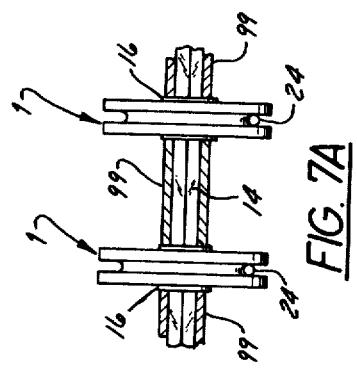
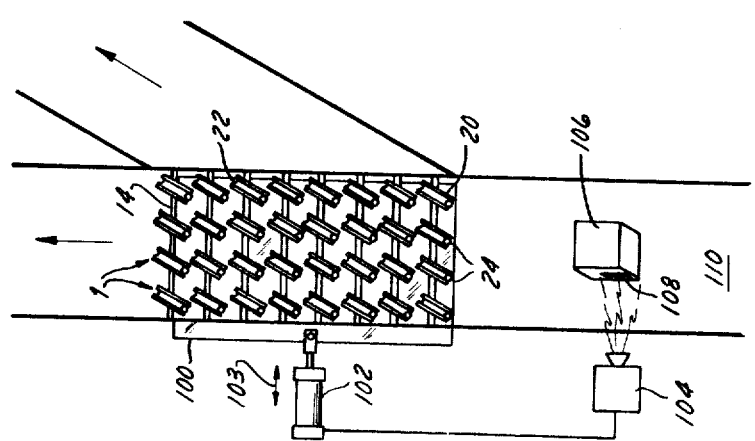

POSITIVELY DRIVEN STEERING MEMBER FOR CONVEYING APPARATUS

BACKGROUND OF THE INVENTION

The present invention relates to means for steering goods and more particularly to means for steering goods on a conveyor.

Conveyors are used to move goods from one place to another. In the process of moving goods on belt conveyors, roller conveyors, and the like, it is often desirable to divert the goods from one conveyor to another, to sort goods arriving from one conveyor onto various other conveyors, to bring goods from several tributary conveyors together onto a single conveyor, or to align the goods on one side of the conveyor. In order to accomplish any of these functions, it is necessary to be able to steer the goods as they move along the conveyor.

Various methods have been used in the past to accomplish some of these functions. A deflector plate has been located at an angle to the movement of the conveyor to push the goods across the conveyor. A device has been used to selectively kick a package or group of packages off of one conveyor onto another. Some devices have used wheels or rollers which can be located at various angles to the normal line of travel of the conveyor and which allow the goods to move by gravity feed in the direction in which the wheels are pointed. Devices of this "gravity feed" type are shown in U.S. Pat. Nos. 3,058,567, Oct. 16, 1962; 3,272,298, Sept. 13, 1966; 3,912,062, Oct. 14, 1975; 3,370,685, Feb. 27, 1968; and 2,613,790, Oct. 14, 1952.

Other devices have used wheels or rollers which can be located at an angle to the normal line of travel of the conveyor and which can be driven, thereby eliminating some of the limitations of the "gravity feed" and other devices. It is this category of devices which is most relevant to the present invention. The following U.S. patents disclose steering mechanisms for conveyors using driven wheels: U.S. Pat. Nos. 3,983,988, Oct. 5, 1976; 3,910,402, Oct. 7, 1975; 3,254,752, June 7, 1966; and 3,552,541, Jan. 5, 1971.

The devices disclosed in those patents are generally arranged so that the drive means is separate from the means for supporting the wheels. This results in bulky, complicated devices having many belts running from shafts located under the wheels and so forth. Some require that the wheels pop up to engage the goods being transported or that the wheels be lowered to engage the drive mechanism, or that groups of wheels otherwise be repeatedly engaged and disengaged, because one set of wheels is only used to drive in one direction. This results in requiring many sets of wheels, many of which are not being driven at any given time. Where the same wheels can be driven in more than one direction, the inventions limit the number of directions, i.e., to two. Many of the devices, because of their cumbersome operation, cannot handle goods coming from a rapidly-moving conveyor and require a relatively long time gap between goods.

A primary object of this invention is to provide a simple, compact device to be used in a conveyor, which device can receive a steady stream of closely-spaced, rapidly-moving goods and can steer the goods in any direction within a wide range of angles. Other objects will be obvious to one skilled in the art.

SUMMARY

To achieve the aforementioned object and other objects, the present invention provides a device used as a positively driven steering member in a conveying apparatus and generally comprises a wheel having a spherically curved inner surface which fits over a hub having a spherically curved outer surface, the wheel and hub being coupled so that the wheel can freely move relative to the hub except that relative movement between the hub and wheel about the axis of the hub is restrained. This arrangement provides that, if the hub is rotated about its own axis, it will drive the wheel, regardless of the angle between the hub and wheel.

The fact that the device disclosed herein can be both supported and driven by a single shaft and that the wheel of the device can be moved to any angle within a wide range of angles to the normal line of travel of a conveyor, makes it possible to produce a simple, compact steering apparatus for a conveyor using several of these devices. A steering apparatus made up of these devices can receive a steady stream of rapidly-moving goods and can steer the goods in any direction within a wide range of angles, permitting its use in a diverter, a sorter, a converger, and in various other functions which will be obvious to one skilled in the art.

For a better understanding of the present invention, reference should now be made to the detailed description and appended drawings in which:

BRIEF DESCRIPTION OF THE DRAWINGS

FIG. 1A shows an exploded perspective of the device shown in FIG. 1.

FIG. 7 is a top view of a schematic showing a group of devices operating in a diverter steering apparatus in a conveyor, including a means for controlling the devices.

FIG. 7A shows a detail of FIG. 7 including two devices mounted on a shaft with a spacer between them.

FIG. 9 is a top view of a schematic showing a group of devices operating in a steering apparatus in a conveyor, using still another means for controlling the devices.

DESCRIPTION

Figure 1:
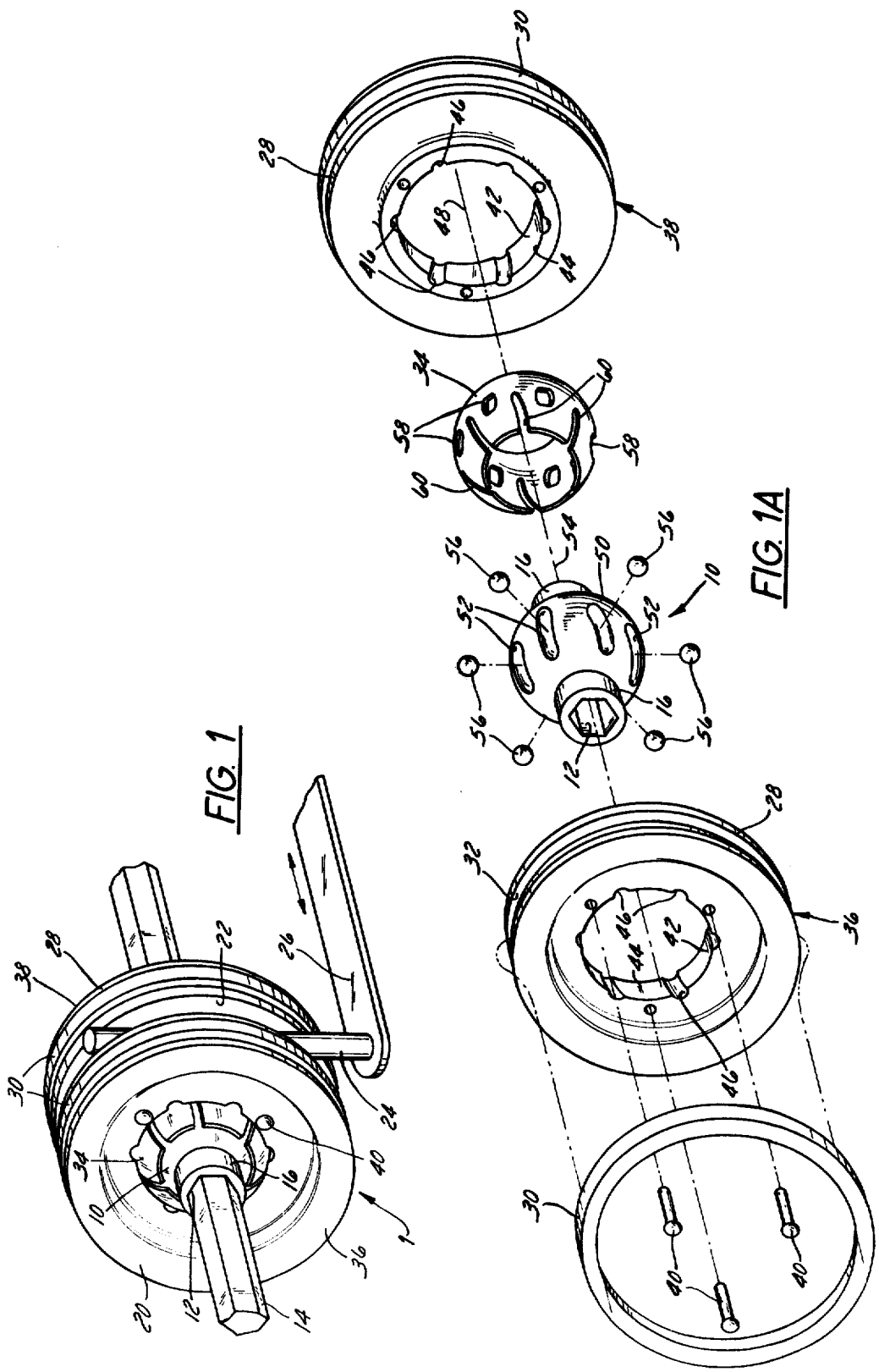
FIG. 1 shows a broken-away perspective of a first embodiment of the device mounted on a shaft, with a control peg and arm in position.

Reference is initially made to the perspective of FIG. 1 showing a device in which a wheel is mounted on a hub having a spherically curved outer surface adapted to fit within the spherically curved inner surface of the wheel. A ball cage is positioned between wheel and hub in a relationship with wheel and hub which will be described in more detail later.

The device 1 includes a hub 10 which has an axial bore 12 of hexagonal cross-section which permits the hub 10 to be mounted on a hexagonal shaft 14 so that the shaft 14 can drive the hub 10 in a rotational motion without slippage. Other standard means for attaching a hub to a shaft in which the bore of the hub and the shaft are of round cross-section may be used, such as passing a pin through the shaft into the hub. The hub and shaft may also be made in one piece for this application. There is a neck 16 on both sides of the hub 10, the purpose of which will be explained later.

The wheel 20 is provided with a circumferential channel 22 which receives a control peg 24 extending from an arm 26, only a part of which is shown. The cooperative function of channel 22, peg 24 and arm 26 will become readily apparent from the description which will follow.

The outer rim 28 of the wheel 20 may be provided, if desired, with a gripping edge made of a material having appropriate frictional characteristics to facilitate movement of goods passing along the conveyor. As shown in the embodiment of FIG. 1, a pair of flat rings 30 is nested in detents 32. The rings 30 may be made of rubber or other similar material and have any desired configuration or cross-section. For example, as shown in FIG. 1 (but best seen in FIG. 3), rings 30 have a rectangular section, whereas in FIG. 4 the cross-section of the rings 30 is circular. Alternatively, other materials may be employed such as gritty material in the nature of sandpaper attached to the rim, or the rim itself could be pitted or otherwise roughened.

While it is perhaps economically preferred to manufacture wheel 20, hub 10 and cage 34 from thermoplastic materials such as an acetal formed through an injection molding process, there are environments in which materials more resistant to wear may be preferred. For example, when the various components of the conveyor are subjected to particulate material, it is desirable that metallic compositions be utilized. A very important criterion which will become more apparent with further reading is the minimization of friction between parts having relative motion. This factor dictates having parts with low coefficients of friction.

To describe in more detail the structural cooperation between the various parts of the device illustrated in FIG. 1, attention is invited to the exploded perspective of FIG. 1A. FIG. 1A shows that wheel 20 is comprised of two separate segments 36, 38. The segments 36, 38 are held together by rivets 40. Each segment, for example segment 38, has a curved inner surface 42 which defines a central opening 44. A plurality of arcuate meridian race grooves 46 is spaced along the inner surface 42, extending substantially parallel to the axis 48 of the wheel 20. Similarly, the outer surface 50 of the hub 10 has a plurality of arcuate meridian race grooves 52 which extend substantially parallel to the axis 54 of the hub 10 and which correspond to the grooves 46 in the wheel 20.

The ball cage 34 is provided with a plurality of apertures 58 which serve to hold the spherical bearing elements 56 in place. One side of the ball cage 34 is provided with a plurality of slots 60 which make assembly of the device simple by permitting the ball cage 34 to open in order to fit over the hub 10 and then to snap into place around the hub 10.

Figure 2:
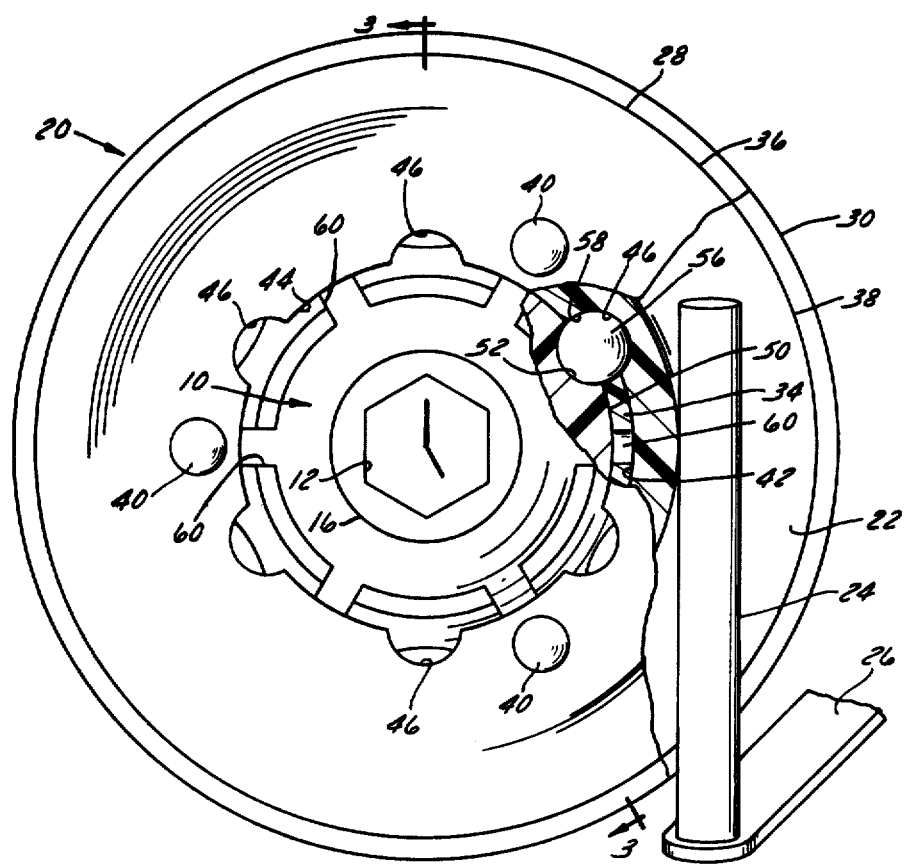
FIG. 2 shows a side view of the device with part of the wheel and hub broken away to show the control peg, bearing element, and ball cage.

To better understand the structural cooperation of the parts of the device, reference is now made to FIG. 2, which shows a side view of the device, with parts of the wheel 20 and hub 10 broken away to shown the inner surface 42 of the wheel, the outer surface 50 of the hub 10, the ball cage 34 located between the surfaces 42, 50, and a bearing element 56 retained in an aperture 58 of the ball cage 34 and riding in grooves 46, 52. The partial section also shows the control peg 24 which is received by the circumferential channel 22.

Figure 3:
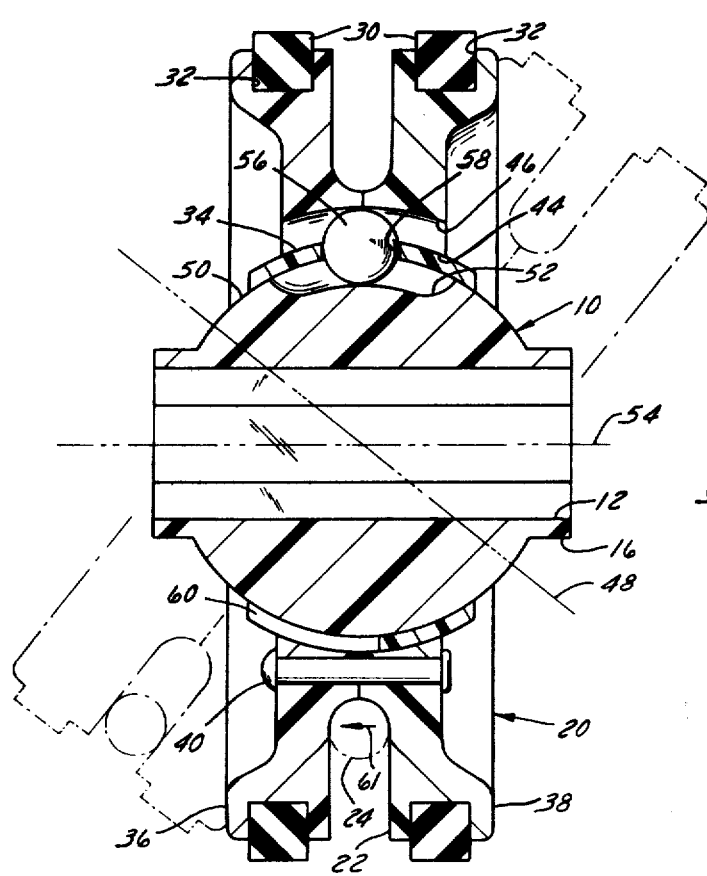
FIG. 3 shows a sectional view of the device taken along the section lines 3—3 of FIG. 2.

Reference is now made to FIG. 3 to illustrate the operation of the device. FIG. 3 is a sectional view of the device as shown in FIG. 2. When the control peg 24 is moved to the left as shown by the arrow 61, it pushes against the wheel 20, causing the axis 48 of the wheel 20 to move relative to the axis 54 of the hub 10. This movement takes place by means of the bearing elements 56 rolling in their respective grooves 46, 52 and carrying the ball cage 34 along as they move. The grooves 46, 52 are aligned substantially parallel to the axes 48, 54, respectively, so the bearing elements 56 cannot move linearly in a direction perpendicular to grooves 46, 52, thereby preventing relative motion between the hub 10 and the wheel 20 about the axis 54 of the hub 10. The relative motion which is permitted between the wheel 20 and hub 10 of this device is such that a shaft 14 (shown in FIG. 1) can be rotated to drive both hub 10 and wheel 20 without slippage, and, at the same time, the axis 48 of the wheel 20 can be moved relative to the axis 54 of the hub 10, so that the wheel 20 is being turned in a different direction from the direction in which the hub 10 is being driven. Therefore, the peg 24 can be moved to various positions, permitting the wheel 20 to carry goods in any direction within a wide range of angles.

Figure 4:
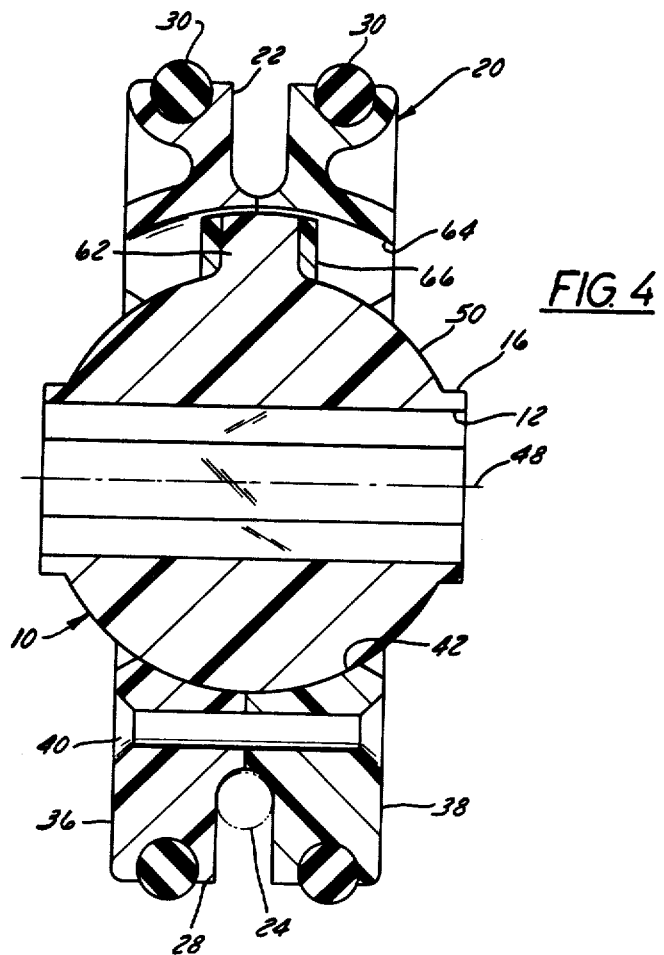
FIG. 4 shows a second embodiment of the device in a sectional view similar to that of FIG. 3.

FIG. 4 illustrates a second embodiment of the device, in which the grooves 46, 52, bearing elements 56, and ball cage 34 are replaced by a pin 62 projecting from the outer surface 50 of the hub 10, which rides in an arcuate meridian keyway 64 in the inner surface 42 of the wheel 20. The relative motion between wheel 20 and hub 10 permitted by this embodiment is substantially equivalent to the relative motion permitted in the first embodiment, but the mechanism is somewhat different. In this second embodiment, the surfaces 50, 42 of the hub 10 and wheel 20 slide relative to each other when the peg 24 pushes against the wheel 20, and the pin 62 can rotate in the keyway 64 or ride along the keyway 64 in a direction substantially parallel to the axis 48 of the wheel 20. However, the pin 62 cannot move perpendicular to the direction of the keyway 64, which therefore permits the wheel 20 to be driven by the hub 10. It is to be noted that, while the pin 62 is of circular cross-section, thereby permitting it to rotate inside the keyway 64 as well as ride along the length of the keyway 64, a round pin 62 would have only line contact with the sides of the keyway 64, which would tend to cause excessive wear. Therefore, in this embodiment, a rectangular block 66 fits around the pin 62 in order to provide contact with the side of the keyway 64 along an entire surface of the block 66. The pin 62 continues to have the freedom to rotate inside the block 66, so the same freedom of motion is preserved while reducing wear.

Figure 5:
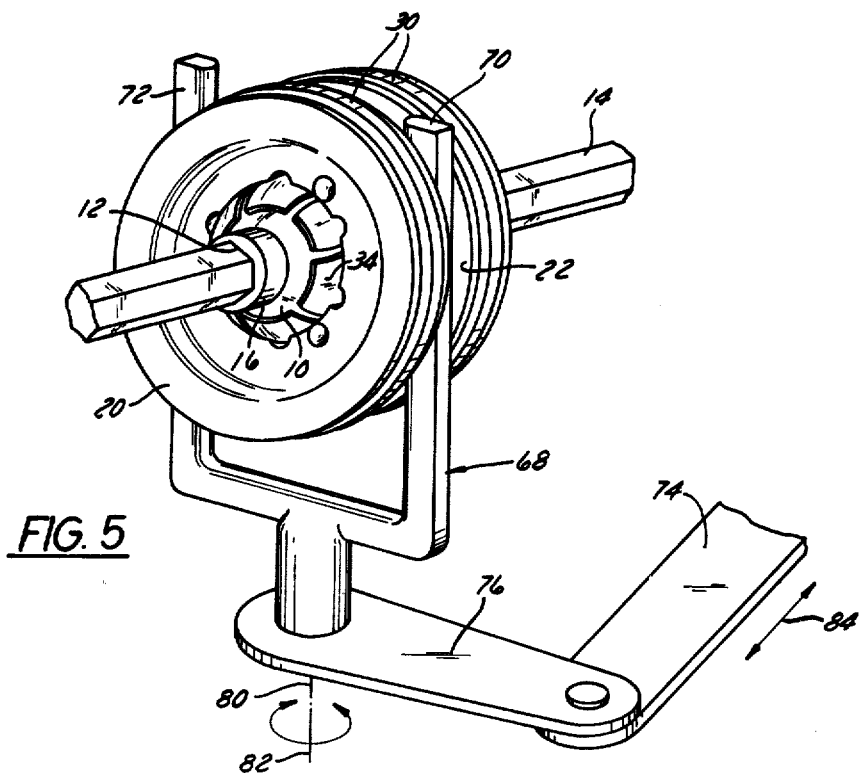
FIG. 5 shows a broken-away perspective of the device mounted on a shaft with a different type of control peg from that shown in FIG. 1.
Figure 6:
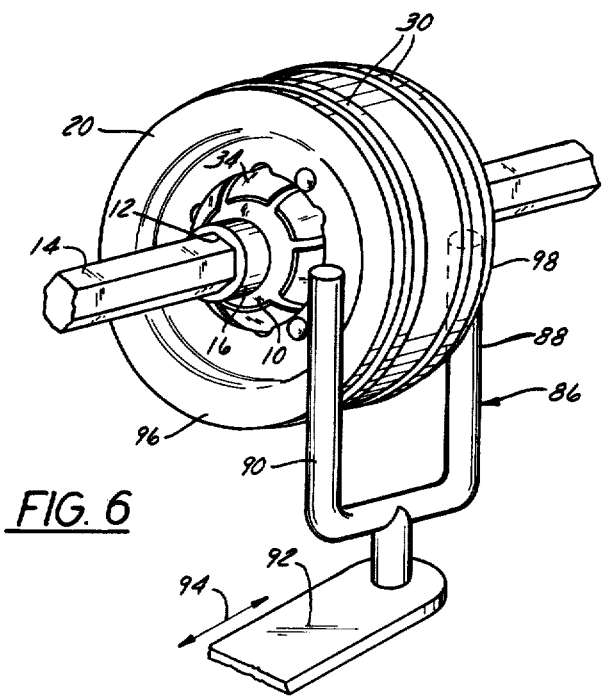
FIG. 6 shows the same view as FIG. 5 with a third type of control peg.

FIGS. 5 and 6 illustrate alternate types of control pegs other than the simple peg 24 shown in FIGS. 1 and 2. FIG. 5 shows a pivoting yoke 68 which consists of two pegs 70, 72 attached to each other, both pegs riding in the circumferential channel 22 of the wheel 20. The yoke 68 is attached to an arm 74 by means of a linkage 76. The linkage 76 is pivotally connected at one end to the arm 74 and is pivotally supported at the other end 80, permitting the pivoting yoke 68 to rotate about its axis 82. Thus, when the arm 74 is moved back and forth as shown by the arrow 84, it causes the pivoting yoke 68 to pivot about its axis 82, thereby causing the wheel 20 to move relative to the hub 10.

FIG. 6 shows a linear yoke 86, made up of two pegs 88, 90 attached to each other. In the linear yoke 86, the pegs 88, 90 fit on the outside of the wheel 20. The linear yoke 86 is attached to arm 92, and, when arm 92 is moved back and forth as shown by the arrow 94, the yoke 86 pushes against one face 96 or the other face 98 of the wheel 20, causing the wheel 20 to move relative to the hub 10. With the linear yoke 86, no circumferential channel is needed in the wheel 20.

FIG. 7 illustrates the use of the devices in a steering apparatus which is part of a conveyor apparatus. The devices 1 are mounted on shafts 14, with several devices 1 on a single shaft 14. The function of the neck 16, now becomes apparent as shown in the detailed drawing in FIG. 7A. The necks 16 permits the hubs 10 to be pushed together on the shaft 14, with necks 16 abutting spacers 99 so that the hubs 10 are prevented from axial movement along the shaft 14. Alternatively, the spacers 99 may be removed and the necks 16 of adjacent hubs 10 may abut one another to achieve the same effect.

The shafts 14 are driven by a power source. The power source can be the same source as that used to drive the conveyor 110 or a separate source used only for the steering apparatus. There are many methods old in the art for transmitting power to a shaft which can be used here. For example, the power can be carried by a shaft and transmitted to the shafts 14 of the steering apparatus by means of belts.

The control pegs 24 in this drawing are all attached to a single, wide arm 100, with each peg 24 riding in a circumferential channel 22. The arm 100, in turn, communicates with a mechanical controller 102, such as a servo-motor, an air cylinder or a number of air cylinders attached in series, or various other types of mechanical controllers. The mechanical controller 102 communicates with a reader-controller 104.

The reader-controller 104 can be any one of a number of types of reader-controllers which can identify a type of pagkage 106 and signal the mechanical controller 102 to move. For example, the reader controller 104 may be a laser-type reader which identifies a code 108 printed on the package 106 and signals the mechanical controller 102 to move to a predetermined position.

The operation of the apparatus shown in FIG. 7 is as follows:

Conveyor 110 carries the package 106 up to the reader-controller 104, which reads the code 108 on the package 106 and signals the mechanical controller 102 to move to the left, thereby pulling the wide arm 100 to the left, and causing the wheels 20 to turn to the right. The package 106 continues to move along the conveyor 110 until it reaches the wheels 20, whereupon its direction changes, and it is diverted to the right. A subsequent package moving along the conveyor 110 may have a different code 108 on it which causes the reader-controller 104 to signal the mechanical controller 102 to move to the right, whereupon the direction of the package 106 is not changed as it is carried by the wheels 20.

Figure 8:
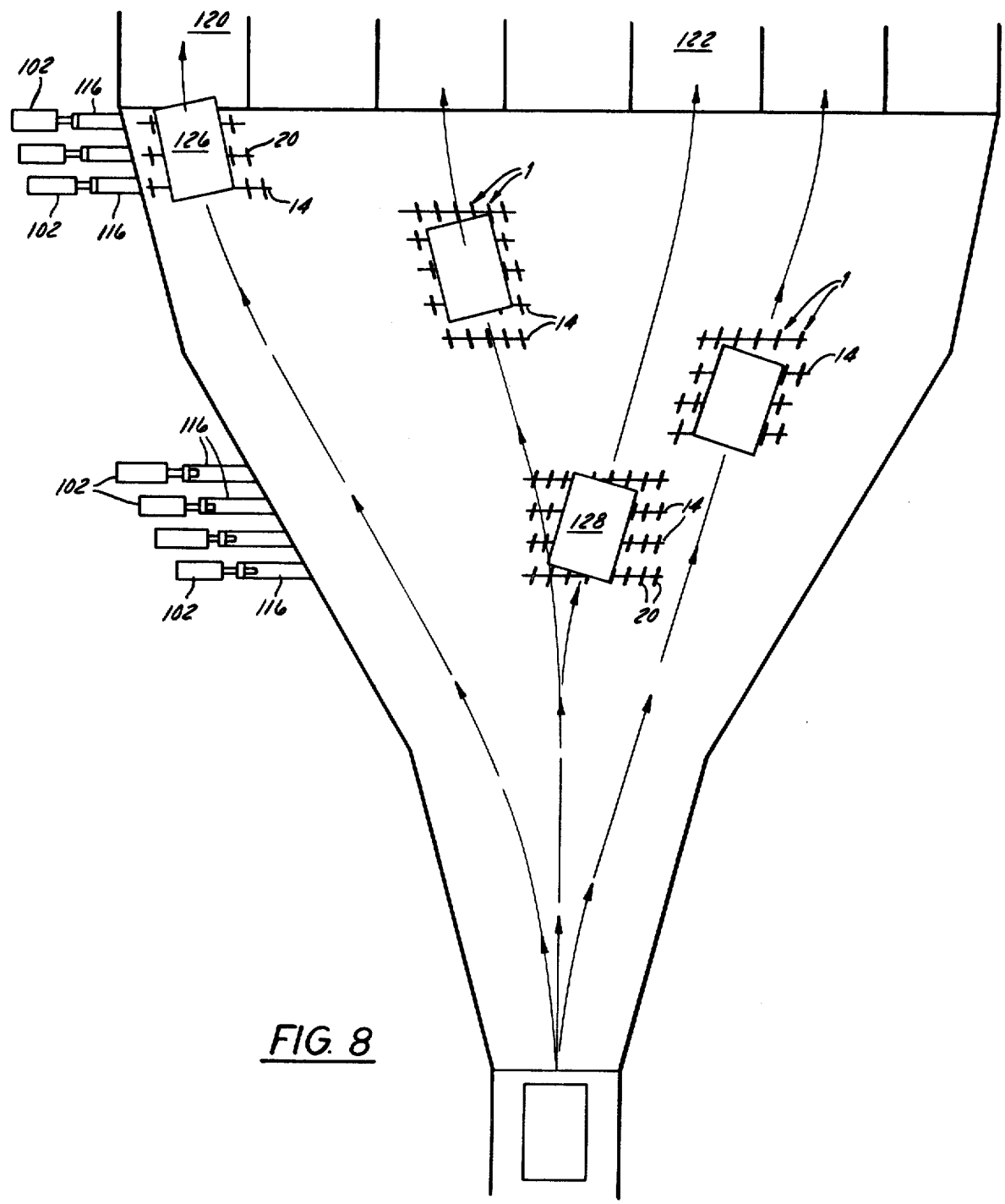
FIG. 8 is a top view of a schematic showing a group of devices operating in a steering apparatus in a sorting conveyor system using another means for controlling the devices.

FIG. 8 represents a sorter which uses a steering apparatus made up of a number of the devices to take goods from an incoming conveyor and distribute them among seven conveyors leaving the steering apparatus. In this illustration, the devices 1 are again mounted on shafts 14. However, instead of a single wide arm having all the control pegs attached to it, in this illustration there is a narrow arm 116 corresponding to each shaft 14, with a separate mechanical controller 102 communicating with each arm 116. Because each arm 116 is separately controlled, a number of packages can be directed in different directions at the same time. As shown in this illustration, the wheels 20 under package 126 are steering it to the left toward conveyor 120, while the wheels 20 under package 128 steer it to the right toward conveyor 122.

FIG. 9 illustrates another means of controlling the devices. In the drawing there are a number of arms 130 underneath the devices 1. Control pegs 24 are attached to the arms 130 and ride in the circumferential channels 22. These arms 130 are attached to pivot points 132 at one end. On the other end, the arms are pivotally attached to a cross-member 134, and thereby communicate with the mechanical controller 102.

The operation of the apparatus in FIG. 9 is as follows:

The mechanical controller 102 pushes the cross-member 134 to the right, causing the arms 130 to pivot in a clockwise direction about their pivot points 132. The pegs 24 nearest the pivot points 132 move a short distance to the right, while those pegs 24 farther from the pivot points 132 move a longer distance to the right. This causes the wheels 20 farthest from the pivot points 132 to turn farther to the left than those closer to the pivot points 132. Thus, a package entering the steering apparatus from conveyor 136 will be gradually turned more and more to the left in an arc as it is carried by the devices 1.

While this description has illustrated two embodiments of the device and several means for controlling the device and using it to steer goods moving along a conveyor, it will be appreciated that many variations may be made, all within the scope of the instant invention as defined in the following claims.

What is claimed is:

1. A device for supporting and conveying articles on a conveyor and adapted for use as a diverter mechanism for selectively determining the path of the articles, comprising:
   a wheel having a spherically curved inner surface defining a central opening and having an outer rim;
   a hub having an axial bore adapted to be mounted on a singular shaft for rotation therewith, said singular shaft extending beyond the sides of said hub, and having a spherically curved outer surface adapted to fit inside of said inner surface;
   said rim having a circumferential channel adapted to receive a control peg, whereby the relative motion between said wheel and said hub may be controlled;
   a coupling means for securing said wheel to said hub and permitting the axis of said wheel to be rotated relative to the axis of said hub in any direction while restraining relative motion between said wheel and said hub about the axis of said hub.

2. The device recited in claim 1, wherein said coupling means comprises:
   at least one first arcuate meridian race groove extending substantially parallel to the axis of said wheel along said inner surface of said wheel;

at least one second arcuate meridian race groove extending substantially parallel to the axis of said hub along said outer surface of said hub;

at least one spherical bearing element riding in said first groove and in said second groove.

3. The device recited in claim 2, wherein said coupling means further comprises:

a ball cage positioned between said inner and outer surfaces and slidably movable between said surfaces, said ball cage having an opening for receiving and retaining said bearing element.

4. The device recited in claim 3, wherein a gripping edge is applied to said rim.

5. The device recited in claim 1 or 4, wherein said axial bore of said hub is of non-circular cross-section.

6. The device recited in claim 1, wherein said coupling means comprises:

an arcuate meridian keyway along one of said surfaces and a pin projecting from the other of said surfaces, said pin being engaged to ride in said keyway.

7. The device recited in claim 6 wherein a gripping edge is applied to said rim.

8. The device recited in claim 6 or 7, wherein said axial bore of said hub is of non-circular cross-section.

9. An apparatus for including means for conveying and steering goods, the steering apparatus comprising:

A. at least one shaft adapted to be driven by a power source;

B. at least one device adapted for use as a positively driven steering member, comprising:

(1) a wheel having a spherically curved inner surface defining a central opening and having an outer rim;

(2) a hub having an axial bore, mounted on said shaft which passes through said bore, and having a spherically curved outer surface adapted to fit inside of said inner surface;

(3) a coupling including means for securing said wheel to said hub and permitting the axis of said wheel to be rotated relative to the axis of said hub in any direction while restraining relative motion between said wheel and said hub about the axis of said hub; and C. a means for controlling the relative motion between said wheel and said hub.

10. The steering apparatus recited in claim 9, wherein said controlling means comprises:

a control peg, whereby said control peg contacts said wheel, pushing said wheel to move it relative to said hub.

11. The steering apparatus recited in claim 10, wherein said controlling means further comprises:

said rim having a circumferential channel which receives said control peg.

12. The steering apparatus recited in claim 10, further comprising:

an arm attached to said control peg, whereby movement of said arm causes movement of said control peg.

13. The steering apparatus recited in claim 12, wherein there is a plurality of said control pegs attached to said arm, with a corresponding plurality of devices.

14. The steering apparatus recited in claim 13, wherein said arm is attached to a pivot point, whereby movement of said arm about said pivot point causes said control pegs located farthest away from said pivot point to move a longer distance than the distance moved by said control pegs located nearest to said pivot point.

15. A conveyor apparatus including means for conveying and steering goods, comprising:

A. A conveyor apparatus of the type which carries goods on its surface;

B. A steering apparatus for steering goods as they move along the surface of said conveyor, including:

(1) a plurality of shafts driven by a power source;

(2) a plurality of devices adapted for use as positively driven steering members, with a plurality of said devices mounted on each of said shafts, each of said devices comprising:

(a) a wheel having a spherically curved inner surface defining a central opening and having an outer rim;

(b) a hub having an axial bore mounted on said shaft which passes through said bore, and having a spherically curved outer surface adapted to fit inside of said inner surface;

(c) a coupling including means for securing said wheel to said hub and permitting the axis of said wheel to be rotated relative to the axis of said hub in any direction while restraining relative motion between said wheel and said hub about the axis of said hub;

(3) a means for moving said wheel relative to said hub; and c. a reader-controller means for reading a label on a package moving along said conveyor and activating said moving means to steer the package in a prescribed direction.

16. The conveyor apparatus recited in claim 15, wherein said moving means comprises:

a plurality of control pegs, each of said control pegs contacting its respective wheel;

an arm having a plurality of said control pegs attached to it; and a mechanical controller communicating with said arm.

17. The conveyor apparatus recited in claim 16, wherein there is a plurality of said arms, each arm being attached at a pivot point, whereby movement of said arms about said pivot points causes said control pegs located farthest away from said pivot points to move a longer distance than the distance moved by said control pegs located nearest to said pivot points.

* * * * *